US010862395B2

(12) United States Patent
Agut et al.

(10) Patent No.: US 10,862,395 B2
(45) Date of Patent: Dec. 8, 2020

(54) SWITCHED-MODE POWER CONVERTER

(71) Applicant: STMicroelectronics SA, Montrouge (FR)

(72) Inventors: Francois Agut, Saint Vital (FR); Severin Trochut, Gilly sur Isere (FR)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 16/437,923

(22) Filed: Jun. 11, 2019

(65) Prior Publication Data

US 2019/0386567 A1    Dec. 19, 2019

(30) Foreign Application Priority Data

Jun. 19, 2018   (FR) ...................... 18 55400

(51) Int. Cl.
*H02M 3/158*  (2006.01)
*H02M 1/08*   (2006.01)
*H02M 1/36*   (2007.01)

(52) U.S. Cl.
CPC ............. *H02M 3/158* (2013.01); *H02M 1/08* (2013.01); *H02M 1/36* (2013.01)

(58) Field of Classification Search
CPC ...... H02M 3/145; H02M 3/155; H02M 3/156; H02M 3/157; H02M 3/158; H02M 1/08; H02M 1/36
See application file for complete search history.

(56) References Cited

U.S. PATENT DOCUMENTS

| | | | |
|---|---|---|---|
| 5,631,816 A * | 5/1997 | Brakus | H02M 3/33507 363/56.1 |
| 2008/0203984 A1 | 8/2008 | Omi | |
| 2008/0238387 A1 * | 10/2008 | Schmeller | H02M 3/156 323/282 |
| 2009/0122585 A1 | 5/2009 | Karasawa | |
| 2013/0223120 A1 | 8/2013 | Dragojevic et al. | |
| 2014/0049238 A1 * | 2/2014 | Hu | G01R 19/00 323/282 |

OTHER PUBLICATIONS

INPI Search Report and Written Opinion for FR 1855400 dated Feb. 21, 2019 (9 pages).

* cited by examiner

*Primary Examiner* — Adolf D Berhane
(74) *Attorney, Agent, or Firm* — Crowe & Dunlevy

(57) ABSTRACT

A switched-mode power converter device includes an inductive element coupling a first node receiving an input voltage to a second node. A first transistor couples the second node to a third node generating an output voltage. A control circuit includes a first switch coupling the third node to a control terminal of the first transistor.

43 Claims, 3 Drawing Sheets

SWITCHED-MODE POWER CONVERTER

PRIORITY CLAIM

This application claims the priority benefit of French Application for Patent No. 1855400, filed on Jun. 19, 2018, the content of which is hereby incorporated by reference in its entirety to the maximum extent allowable by law.

TECHNICAL FIELD

The present disclosure generally relates to electronic circuits and, more specifically, to switched-mode power converters.

BACKGROUND

In a switched-mode power converter, a DC voltage, supplied to an input of the converter, is chopped by switching of one or a plurality of switches to implement phases of power storage in an inductive element and phases of discharge, towards a load connected to the converter output, of the power stored in the inductive element.

There is a need in the art for a switched-mode power converter that overcomes all or part of the disadvantages of usual switched-mode power converters and, in particular, overcomes the disadvantages due to the connection of a power supply voltage source.

SUMMARY

An embodiment provides a device comprising: an inductive element coupling a first node to a second node; at least one first transistor coupling the second node to a third node; and a first control circuit comprising a first switch coupling the third node to a control terminal of the first transistor, the device forming a switched-mode power converter.

According to an embodiment, a second switch couples the second node to a fourth node of application of a reference potential.

According to an embodiment, the first switch is a second transistor having a channel of the same type as that of the first transistor.

According to an embodiment, the first transistor has an N channel.

According to an embodiment, the first circuit comprises a second circuit for controlling the first switch.

According to an embodiment, the first control circuit further comprises: a capacitive element connected between the second node and a fifth node; and a series association of a first diode and of a third switch connected between the fifth node and the control terminal of the first transistor.

According to an embodiment, the control terminal of the third switch is connected to the control terminal of the first switch.

According to an embodiment, the third switch is a third transistor having a channel type opposite to that of the channel of the first transistor.

According to an embodiment, between the second and third nodes, the first transistor is in series with a second diode.

According to an embodiment, the second diode and the body diode of the first transistor are connected in reverse directions with respect to each other.

Another embodiment provides an electronic circuit comprising a device such as defined hereabove.

Another embodiment provides a method of starting a device such as defined hereabove.

According to an embodiment, the method comprises the steps of: connecting a DC voltage source to the first node; and setting the first transistor to the off state by turning on the first switch.

According to an embodiment, the first switch is maintained on by the first control circuit until the third node is at a potential substantially equal to the potential applied to the first node.

According to an embodiment, the second circuit supplies the control terminal of the first switch with the highest potential between the potentials of the third node and of the first node or the highest potential between the potentials of the third node and of the second node.

According to an embodiment, the second switch is controlled in pulse-width modulation once the potentials of the first and third nodes are substantially equal.

BRIEF DESCRIPTION OF THE DRAWINGS

The foregoing and other features and advantages will be discussed in detail in the following non-limiting description of specific embodiments in connection with the accompanying drawings. For a better understanding of the embodiments, reference will now be made by way of example only to the accompanying figures in which.

DETAILED DESCRIPTION

Figure 3:
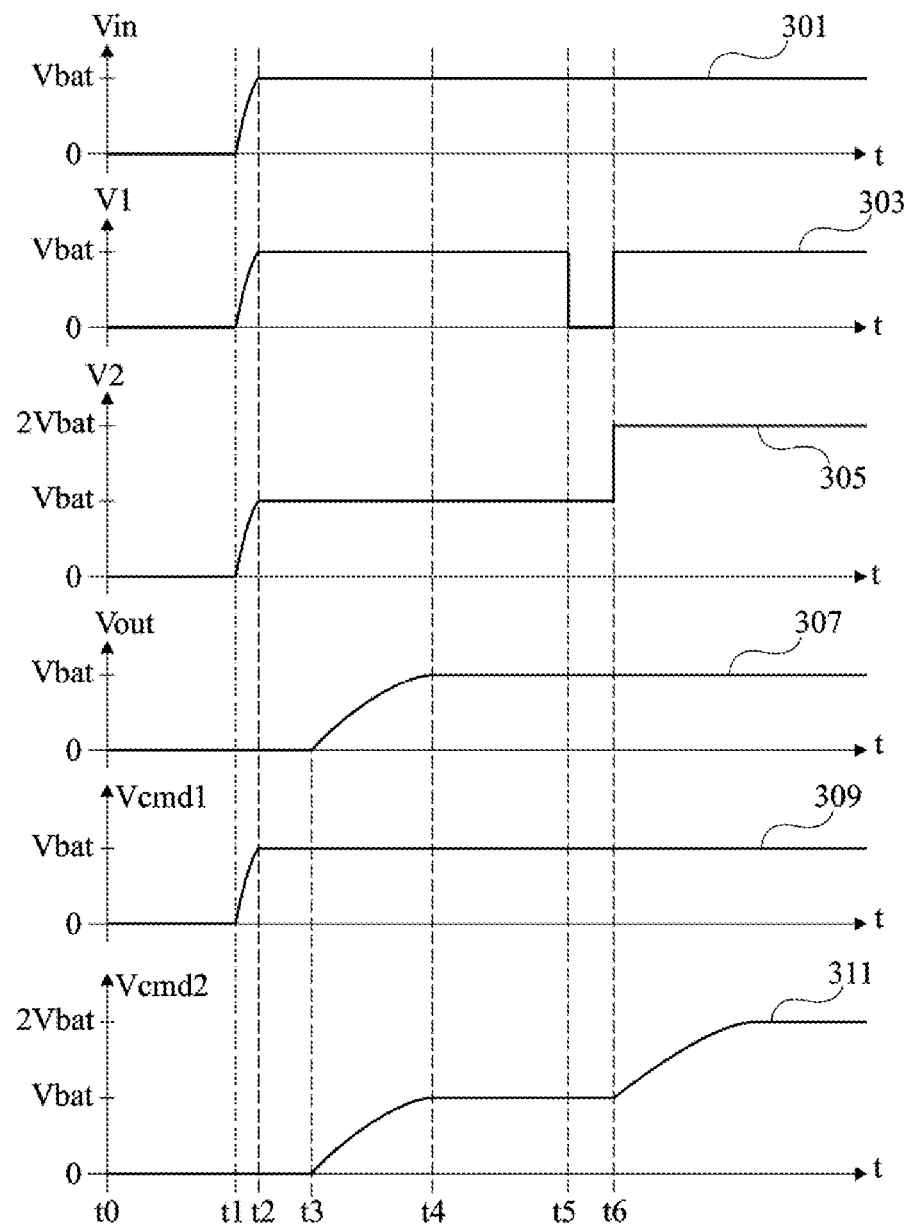
FIG. 3 shows timing diagrams illustrating an example of operation of the converter of FIG. 1.

The same elements have been designated with the same reference numerals in the different drawings. In particular, the structural and/or functional elements common to the different embodiments may be designated with the same reference numerals and may have identical structural, dimensional, and material properties. Further, the various drawings, in particular the timing diagrams of FIG. 3, are not drawn to scale.

For clarity, only those steps and elements which are useful to the understanding of the described embodiments have been shown and are detailed. In particular, the circuits for controlling the cut-off switches and the control of such switches, for example, in pulse-width modulation (PWM), have not been described, the described embodiments being compatible with usual solutions.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more intermediate elements.

The terms "about", "substantially", and "approximately" are used herein to designate a tolerance of plus or minus 10%, preferably of plus or minus 5%, of the value in question.

Further, when it is considered that no current flows between two nodes, unless otherwise specified, possible leakage currents capable of flowing between the two nodes are not taken into account.

Figure 1:
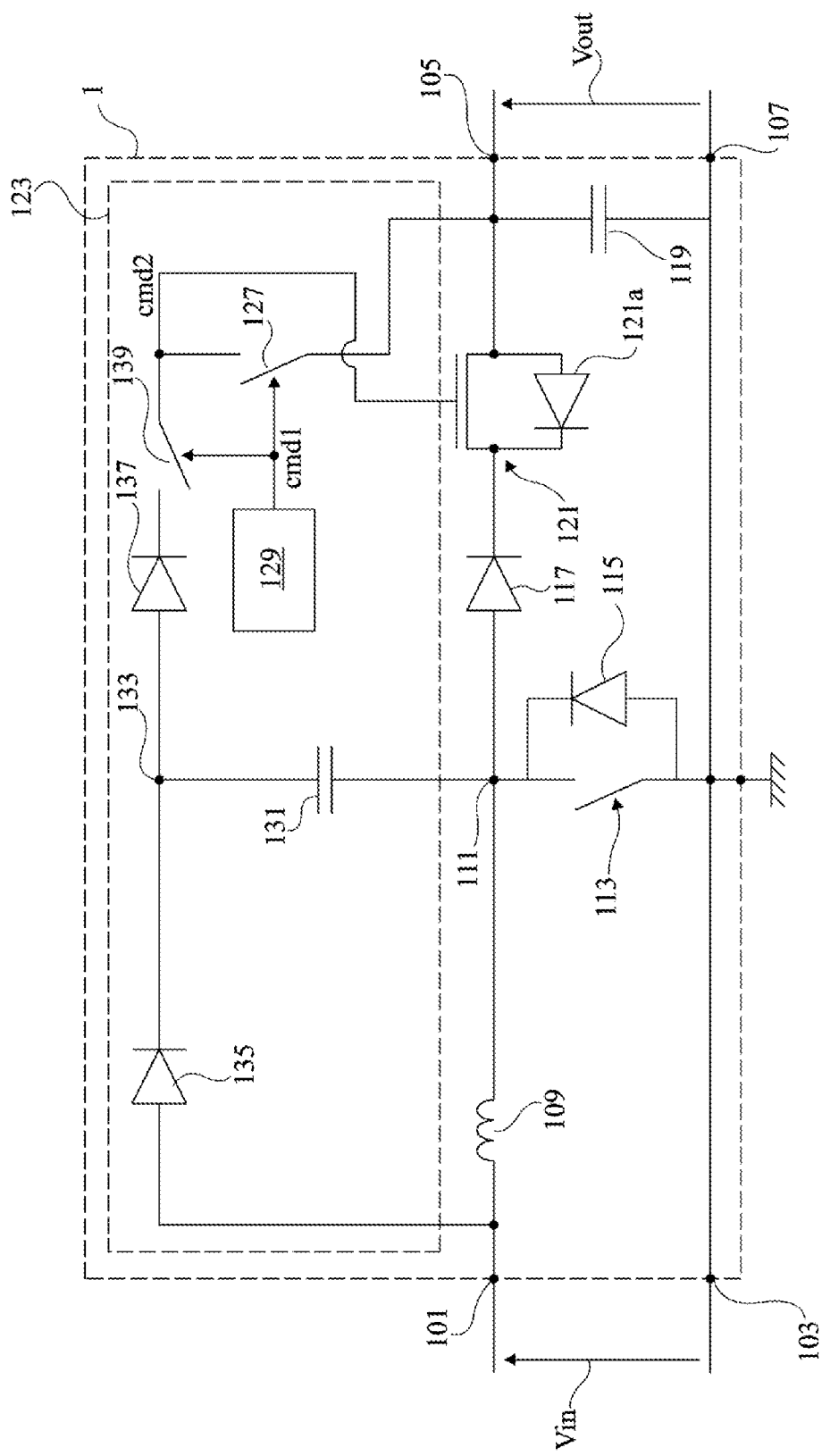
FIG. 1 schematically shows an embodiment of a DC/DC switched-mode power converter.

FIG. 1 shows a circuit of an embodiment of a DC/DC switched-mode power converter that converts a DC power supply voltage into another DC voltage.

Converter 1 comprises two input terminals or input nodes 101 and 103 configured to receive a DC power supply voltage Vin and two output terminals or output nodes 105 and 107 configured to supply a DC output voltage Vout. Voltage Vin is, for example, positive and referenced to node 103, typically, the ground. Voltage Vout is, for example, positive and referenced to node 107, node 107 being here connected to node 103.

An inductive element 109 couples node 101 to an inner (i.e., intermediate) node 111 of converter 1.

Nodes 111 and 103 are coupled by a cut-off switch 113 connected in parallel with a diode 115. In this example, the anode of diode 115 is connected to node 103 and the cathode is connected to node 111. As an example, the parallel association of switch 113 and of diode 115 is implemented by a MOS transistor, for example, with an N-type channel, with the diode 115 then corresponding to the body diode of the transistor.

A capacitive element 119 couples output nodes 105 and 107. Capacitive element 119 is preferably external to converter 1, but may also be partially or totally integrated in converter 1, as shown in FIG. 1.

Node 111 is coupled to output node 105 by a series association of a diode 117 and of a transistor 121, in this example, an N-channel MOS transistor. Body diode 121a of transistor 121 and diode 117 are connected in reverse directions with respect to each other. In this example, the source of transistor 121 and the anode of diode 121a are coupled, preferably connected, to node 105. The cathode of diode 121a is then coupled, preferably connected, to the cathode of diode 117 and the drain of transistor 121, the anode of diode 117 being coupled, preferably connected, to node 111.

As a variation, a cut-off switch (not shown), controlled in a reverse direction (i.e., opposite phase) with respect to switch 113, is connected in parallel with diode 117. In this variation, this switch and diode 117 are, for example, formed by a MOS transistor, for example, with an N channel, with diode 117 then corresponding to the body diode of the transistor.

Converter 1 comprises a circuit 123 for controlling transistor 121. Circuit 123 is configured to supply a control signal cmd2 to the control terminal or gate of transistor 121. Circuit 123 comprises a switch 127 coupling node 105 to the gate of transistor 121. Circuit 123 comprises a circuit 129 configured to supply a control signal cmd1 to the control terminal of switch 127.

On connection of a power supply voltage source Vin to terminals 101 and 103, circuit 123 is configured to maintain switch 127 in an on (i.e., closed) state until voltage Vout is substantially equal to power supply voltage Vin, that is, until node 105 is at a potential substantially equal to the potential of node 101.

In the shown embodiment, circuit 123 also comprises a switch 139. The control terminal of switch 139 is connected to the control terminal of switch 127, to receive the control signal cmd1. A conduction terminal of switch 139 is coupled, preferably connected, to the gate of transistor 121. The other conduction terminal of switch 139 is coupled to the input node 101 through two diodes 135 and 137 coupled in series with each other. A capacitive element 131 couples node 111 to an intermediate node 133 which is located at the circuit interconnection of the series coupled diodes 135 and 137. In this example, the anodes of diodes 135 and 137 are on the side of respective nodes 101 and 133. Circuit 123 is configured to turn on (i.e., close) switch 121 after a turning-off of switch 113.

Initially, when no voltage is applied between input terminals 101 and 103, switches 113, 127, and 139 are off (i.e., open) and transistor 121 is off (i.e., non-conducting).

In a first operating phase, following the connection of a voltage source Vin to nodes 101 and 103, converter 1 is not controlled in switched mode. Switch 113 thus remains off. As a result of the connection of the voltage source, circuit 129 turns on (i.e., closes) switch 127 with switch 139 remaining off. Thus, the potential of node 105 is applied to the gate of transistor 121, whereby the gate-to-source voltage of transistor 121 is substantially zero. Transistor 121 thus remains off. Due to transistor 121 being off and switch 113 being off, theoretically, no current flows from node 101 to node 105 through inductive element 109. However, in the shown embodiment, voltage Vout increases due to leakage currents between nodes 101 and 105. In another embodiment, the increase of voltage Vout results from the turning-on of an optional turn-on switch connected between nodes 101 and 105. When voltage Vout becomes substantially equal to Vin, switch 127 is turned off. The gate of transistor 121 then remains charged to a potential substantially equal to the potential of node 105, and transistor 121 remains off.

In a second operating phase, converter 1 is controlled in switched mode, for example, in pulse-width modulation control of the transistor switch 113. During a first switching cycle, switch 113 is turned on (i.e., closed). Such a turning-on will results in a voltage substantially equal to Vin being present across capacitive element 131 (to within the voltage in diode 135). Switch 113 is then turned off and the potential of node 111 increases. Since capacitive element 131 cannot discharge, it performs a level shifting between the potentials of nodes 111 and 133, the potential of node 133 following the increase of the potential of node 111 with a level shift in the order of Vin. At the same time, switch 139 is turned on. The gate of transistor 121 is then taken to the level shifted potential of node 133. This potential is sufficient for transistor 121 to turn on. Circuit 123 then maintains switch 139 on until converter 1 turns off, which enables to maintain transistor 121 on. Indeed, for each switching cycle, the capacitive element supplies a potential difference between, on the one hand, node 133 coupled to the gate of transistor 121 by switch 139 when in the on state and, on the other hand, node 105, such a potential difference being sufficient to maintain transistor 121 in the on state. As long as transistor 121 is turned on, the usual operation of power storage in inductive element 109 when switch 113 is turned on and of delivery of this power to capacitive element 119 when switch 113 is turned off can be observed.

An advantage of the described circuit, in particular the use of transistor 121, is that it avoids, from as soon as the connection of a voltage source Vin, between nodes 101 and 105, the flow of an inrush current through inductive element 109. Such an inrush current would risk deteriorating the converter and/or components connected at the converter output.

The fact that transistor 121 and its control circuit are integrated in converter 1 is a less complex and less bulky solution than with components external to the converter, in particular discrete external components.

Figure 2:
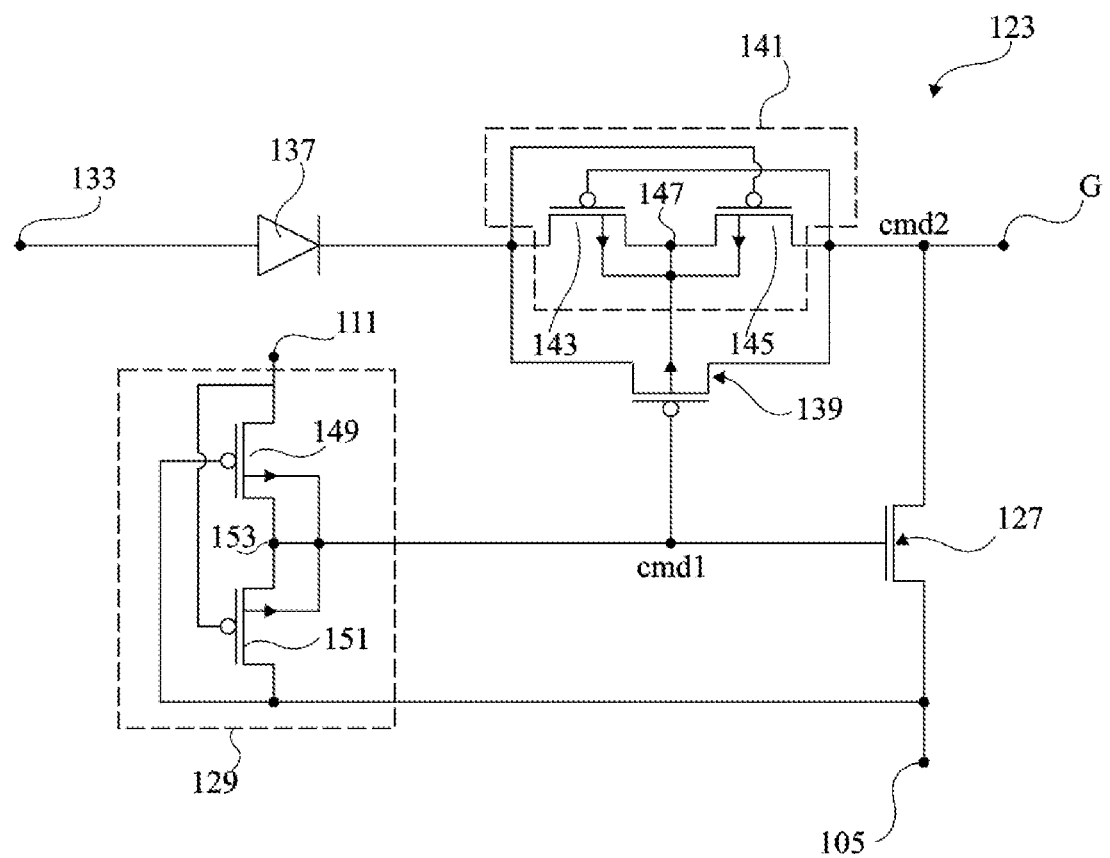
FIG. 2 shows in further detail an embodiment of a portion of the converter of FIG. 1.

FIG. 2 shows in further detail an embodiment of a portion of converter 1 of FIG. 1, and more particularly of a portion of control circuit 123.

FIG. 2 shows node 133, diode 137, switch 139, control terminal G of transistor 121, node 105, switch 127, circuit 129, and node 111.

In this embodiment, switch 127 is a MOS transistor, this transistor and transistor 121 being of the same channel type, in this example, an N channel. The source of transistor 127 is coupled, preferably connected, to node 105. Switch 139 is also a MOS transistor, but with a channel of the type opposite to that of the channel of transistors 121 and 127. In this example, transistor 139 thus has a P channel.

Control circuit 123 comprises a circuit 141 for biasing the substrate of transistor 139. More particularly, in this example, circuit 141 is configured to take the substrate of transistor 139 to the highest potential between the potentials of node 133 and of gate G. As an example, circuit 141 comprises two PMOS transistors 143 and 145 having source-drain paths connected in series, coupling the cathode of diode 137 to gate G of transistor 121. The gate of transistor 143 is connected to gate G of transistor 121, the gate of transistor 145 being connected to the cathode of diode 137. Node 147 of interconnection of transistors 143 and 145 is connected to the substrates of transistors 143, 145, and 139.

Circuit 129 is here configured to apply, to the gates of transistors 127 and 139, the highest potential between the potentials of nodes 105 and 111. As an example, circuit 129 comprises two PMOS transistors 149 and 151 having source-drain paths connected in series, coupling nodes 111 and 105. The gate of transistor 149 is connected to node 105, the gate of transistor 151 being connected to node 111. Node 153 of interconnection of transistors 149 and 151 is connected to the substrates of transistors 149 and 151, and to the gates of transistors 139 and 127.

In an alternative embodiment, not shown, circuit 129 is configured to apply, to the gates of transistors 127 and 139, the highest potential among the potentials of nodes 105 and 101. In the example of FIG. 2, this amounts to replacing node 111 with node 101.

FIG. 3 shows timing diagrams illustrating an example of operation of the converter of FIG. 1 implemented as described in relation with FIG. 2.

Timing diagrams 301, 303, 305, 307, 309, and 311 illustrate the time variation, respectively, of voltage Vin, of voltage V1 of node 111, of voltage V2 of node 133, of voltage Vout, of voltage Vcmd1 of the gate of transistor 127, and of voltage Vcmd2 of gate G of transistor 121. When reference is made to the voltage of a node or of the gate of a transistor, it is considered that it is the voltage between this node or this gate and the ground (node 103). In other words, when reference is made to the voltage of a node or of the gate of a transistor, it is the potential of this node or of this gate.

At an initial time t0, no power supply voltage source is connected between nodes 101 and 103. Voltages Vin, V1, V2, Vout, Vcmd1, and Vcmd2 are thus zero. Further, switch 113 is off and transistors 121, 127, and 139 are off.

At a next time t1, marking the beginning of the first operating phase, a DC voltage source Vin, for example, a battery, is connected between node 101 and 103.

From time t1, due to the stray capacitances of converter 1, voltage Vin increases to reach a stable value Vbat at a time t2. Transistor 121 is off, which results in that voltage Vout remains substantially zero. Further, switch 113 being off and transistor 121 being off, voltages V1 and V2 are substantially equal to voltage Vin and increase with voltage Vin. Voltage Vcmd1, which corresponds to the maximum of voltages Vout and V1, is then substantially equal to voltage V1, and thus to voltage Vin, and increases with voltage Vin. Such an increase in voltage Vcmd1 with respect to voltage Vout results in that the gate-source voltage of transistor 127 becomes sufficient for the transistor to be on. Further, due to the fact that voltages Vcmd1 and V2 are substantially equal to voltage Vin and increase with voltage Vin, the gate-source voltage of transistor 139 remains zero or nearly zero. As a result, transistor 139 remains off. Due to the fact that transistors 127 and 139 are respectively on and off, voltage Vcmd2 is substantially equal to voltage Vout. Thus, the gate-source voltage of transistor 121 is zero or nearly zero and transistor 121 effectively remains off until time t2.

At time t2, voltage Vin is equal to Vbat, voltages V1, V2, and Vcmd1 are substantially equal to Vin, and voltages Vout and Vcmd2 are zero or nearly zero.

From a subsequent time t3, capacitive element 119 progressively charges, either due to leakage currents between nodes 101 and 105, or by turning-on of an optional turn-on switch connected between these nodes. Voltage Vout thus increases until it is substantially equal, at a time t4, to voltage Vin, that is, to Vbat.

Between times t3 and t4, while voltage Vout increases, voltages V1 and V2 are substantially equal to voltage Vin. Voltage Vcmd1, which corresponds to the maximum of voltages Vout and V1, is then substantially equal to voltage V1, and thus to voltage Vin. Since voltages Vcmd1 and V2 are both substantially equal to Vin, the gate-source voltage of transistor 139 is zero or nearly zero and transistor 139 remains off. Further, as long as voltage Vout is not substantially equal to voltage Vin, the difference between voltages Vcmd1 and Vout is such that the gate-source voltage of transistor 127 is sufficient to maintain it on, voltage Vcmd2 then following voltage Vout. As a result, the gate-source voltage of transistor 121 is zero or nearly zero and transistor 121 remains off. However, when voltage Vout becomes substantially equal to voltage Vin, voltages Vcmd1 and Vout becomes substantially equal. The gate-source voltage of transistor 127 then becomes zero or nearly zero and transistor 127 turns off. Once transistor 127 has turned off, gate G of transistor 121 is floating and voltage Vcmd2 remains substantially equal to voltage Vout at the time of the turning-on of switch 127, that is, to Vbat. As a result, the gate-source voltage of transistor 121 is zero or nearly zero and transistor 121 remains off.

Thus, at time t4, voltage Vin is equal to Vbat, voltages V1, V2, Vout, Vcmd1, and Vcmd2 are all substantially equal to Vbat, switch 113 is off, and transistors 121, 127, and 139 are all off.

At a subsequent time t5, marking the end of the first operating phase and the beginning of the second operating phase, switch 113 is turned on until a time t6.

Between times t5 and t6, voltage V1 is zero or nearly zero and voltage V2 is substantially equal to voltage Vin, that is, to Vbat. The values of the other voltages Vin, Vout, Vcmd1 remain substantially the same as at time t4. Transistors 127 and 139 thus remain off. As a result, voltage Vcmd2 remains substantially equal to Vbat, and thus to voltage Vout, and transistor 121 remains off.

At time t6, switch 113 is turned off and voltage V1 of node 111 increases. Since capacitive element 131 performs a level shifting between the potentials of nodes 111 and 133, voltage V2 of node 133 also increases, with a shift in the order of Vbat relative to voltage V1. Thus, while voltage V1 is still smaller than Vbat, voltage V2 is already greater than Vbat and voltage Vcmd1 is still equal to Vbat (voltage Vout). The gate-source voltage of transistor 139 is then sufficient for transistor 139 to be on and for the potential of node 133 to be taken to gate G of the transistor. The capacitance of gate G of transistor 121 charges and voltage Vcmd2 increases. The increase of voltage Vcmd2 with respect to voltage Vout results in that the gate-source voltage of transistor 121 becomes sufficient for transistor 121 to be on. Once transistor 121 is on, a current may flow from node 111 to node 105, and power stored in inductive element 109 is delivered back to capacitive element 119. Further, once transistor 121 is on, voltages V1 and Vout balance.

It should be noted that, in certain cases, after time t6, voltage V1 may exhibit a voltage peak reaching values greater than Vbat, particularly due to the fact that the time taken for voltage V1 to increase beyond Vbat may be short as compared with the time necessary for transistor 139, and then transistor 121, to turn on. In such cases, voltage Vcmd1 then becomes substantially equal to voltage V1, and follows the increase of voltage V1. However, since voltage V2 is shifted by Vbat with respect to voltage V1, the gate-source voltage of transistor 139 still remains sufficient for transistor 139 to turn on, whereby transistor 121 turns on and voltage V1 decreases to become substantially equal to voltage Vout.

An advantage of applying to the gates of transistors 127 and 139 the highest potential between the potentials of nodes 111 and 105 is to ascertain that the gate-source voltage of transistor 139 always remains smaller than or equal to Vbat.

Although this is not illustrated in FIG. 3, converter 1 is of boost type. Thus, after a plurality of switching cycles of switch 113, switch 113 is controlled to obtain, in steady sate, a voltage Vout having a selected value greater than Vbat.

In the converter 1 formed according to the embodiment of FIG. 2, the maximum gate-source, gate-drain, and drain-source voltages, in absolute value, of transistors 121, 127, and 139 are in the order of Vbat, and thus smaller than the maximum voltage Vout that converter 1 can deliver.

In an alternative embodiment (not shown), control circuit 123 does not comprise switch 139. In this case, circuit 123 may comprise switch 127 and circuit 129 only. The control to maintain transistor 121 on, once voltage Vout is substantially equal to voltage Vin, may then be implemented by means of another control circuit, for example, a circuit comprising a charge pump and being configured to maintain the gate capacitance of transistor 121 sufficiently charged for transistor 121 to remain on, the charge pump being for example coupled to node 105.

Various embodiments and variations have been described. It will be understood by those skilled in the art that certain characteristics of these various embodiments and variations may be combined, and other variations will occur to those skilled in the art. In particular, it is within the abilities of those skilled in the art to provide a transistor 121 and a control circuit 123 in other types of converters than a boost converter, by adapting control circuit 123. For example, a transistor 121 and a control circuit of the type of circuit 123 may be provided in a buck-boost switched-mode power converter or in a power factor correction (PFC) switched-mode power converter.

Further, switch 113 and, if present, a switch in parallel with diode 117, may be controlled otherwise than in pulse-width modulation, for example, in frequency modulation.

Finally, the practical implementation of the described embodiments and variations is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:
1. A device, comprising:
an inductive element coupling a first node to a second node, said first node configured to receive an input voltage;
a first transistor coupling the second node to a third node, said third node configured to generate an output voltage; and
a first control circuit comprising a first switch including a first terminal coupled to receive the output voltage from the third node, a second terminal coupled to selectively apply the output voltage to a control terminal of the first transistor, and a control terminal configured to control switching of said first switch;
wherein the device forms a switched-mode power converter for converting the input voltage to the output voltage.

2. The device of claim 1, wherein a second switch couples the second node to a fourth node of application of a reference potential.

3. The device of claim 1, wherein the first switch is a second transistor having a channel doped with a same conductivity type as a channel of the first transistor.

4. The device of claim 1, wherein the first transistor has an N channel.

5. The device of claim 1, wherein the first control circuit comprises a second control circuit generating a switch control signal applied to the control terminal of the first switch.

6. A device, comprising:
an inductive element coupling a first node to a second node, said first node configured to receive an input voltage;
a first transistor coupling the second node to a third node, said third node configured to generate an output voltage; and
a first control circuit comprising a first switch coupling the third node to a control terminal of the first transistor,
wherein the device forms a switched-mode power converter for converting the input voltage to the output voltage;
wherein the first control circuit further comprises:
a capacitive element connected between the second node and a fifth node; and
a series association of a first diode and of a third switch connected between the fifth node and the control terminal of the first transistor.

7. The device of claim 6, wherein the control terminal of the third switch is connected to the control terminal of the first switch.

8. The device of claim 6, wherein the third switch is a third transistor having a channel doped with a first conductivity type and wherein the first transistor has a channel doped with a second conductivity type opposite that of the first conductivity type.

9. The device of claim 6, wherein, between the second and third nodes, the first transistor is coupled in series with a second diode.

10. The device of claim 9, wherein the second diode and a body diode of the first transistor are connected in reverse directions with respect to each other.

11. The device of claim 6, wherein the device is a component of an electronic circuit.

12. A device, comprising:
an inductive element coupling a first node to a second node, said first node configured to receive an input voltage;
a first transistor coupling the second node to a third node, said third node configured to generate an output voltage; and
a first control circuit comprising a first switch coupling the third node to a control terminal of the first transistor,
wherein the device forms a switched-mode power converter for converting the input voltage to the output voltage;
wherein the first control circuit is configured to start the device in response to application of a DC voltage source supplying the input voltage to the first node by setting the first transistor to an off state by turning on the first switch.

13. The device of claim 12, wherein the first control circuit is configured to maintain the first switch in an on state until a potential at the third node is substantially equal to the input voltage at the first node.

14. The device of claim 12, wherein the first control circuit is configured to supply, to the control terminal of the first switch, a highest potential between a potential at the third node and a potential at the first node.

15. The device of claim 12, wherein the first control circuit is configured to supply, to the control terminal of the first switch, a highest potential between a potential at the third node and a potential at the second node.

16. The device of claim 12, wherein a second switch couples the second node to a fourth node of application of a reference potential, and wherein the first control circuit is configured to control the second switch in pulse width modulation once potentials of the first and third nodes are substantially equal.

17. The device of claim 12, wherein a second switch couples the second node to a fourth node of application of a reference potential.

18. The device of claim 12, wherein the first switch is a second transistor having a channel doped with a same conductivity type as a channel of the first transistor.

19. The device of claim 12, wherein the first transistor has an N channel.

20. The device of claim 12, wherein the first control circuit comprises a second control circuit for controlling the first switch.

21. The device of claim 12, wherein, between the second and third nodes, the first transistor is coupled in series with a diode.

22. The device of claim 21, wherein the diode and a body diode of the first transistor are connected in reverse directions with respect to each other.

23. The device of claim 12, wherein the device is a component of an electronic circuit.

24. The device of claim 6, wherein a second switch couples the second node to a fourth node of application of a reference potential.

25. The device of claim 6, wherein the first switch is a second transistor having a channel doped with a same conductivity type as a channel of the first transistor.

26. The device of claim 6, wherein the first transistor has an N channel.

27. The device of claim 6, wherein the first control circuit comprises a second control circuit for controlling the first switch.

28. A device, comprising:
an inductive element coupling a first node to a second node, said first node configured to receive an input voltage;
a first transistor coupling the second node to a third node; and
a first control circuit comprising a first switch that, when turned on, applies a potential at the third node to a control terminal of the first transistor,
wherein the device forms a switched-mode power converter for converting the input voltage to generate an output voltage at the third node.

29. The device of claim 28 wherein a second switch couples the second node to a fourth node of application of a reference potential.

30. The device of claim 28, wherein the first switch is a second transistor having a channel doped with a same conductivity type as a channel of the first transistor.

31. The device of claim 28, wherein the first transistor has an N channel.

32. The device of claim 28, wherein the first control circuit comprises a second control circuit for controlling the first switch.

33. The device of claim 28, wherein the first control circuit further comprises:
a capacitive element connected between the second node and a fifth node; and
a third switch that, when turned on, applies a potential at the fifth node to the control terminal of the first transistor.

34. The device of claim 33, wherein the control terminal of the third switch is connected to the control terminal of the first switch.

35. The device of claim 33, wherein the third switch is a third transistor having a channel doped with a first conductivity type and wherein the first transistor has a channel doped with a second conductivity type opposite that of the first conductivity type.

36. The device of claim 28, wherein, between the second and third nodes, the first transistor is coupled in series with a diode.

37. The device of claim 36, wherein the second diode and a body diode of the first transistor are connected in reverse directions with respect to each other.

38. The device of claim 28, wherein the device is a component of an electronic circuit.

39. The device of claim 28, wherein the first control circuit is configured to start the device in response to application of a DC voltage source supplying the input voltage to the first node by setting the first transistor to an off state by turning on the first switch.

40. The device of claim 39, wherein the first control circuit is configured to maintain the first switch in an on state until a potential at the third node is substantially equal to the input voltage at the first node.

41. The device of claim 39, wherein the first control circuit is configured to supply, to the control terminal of the first switch, a highest potential between a potential at the third node and a potential at the first node.

42. The device of claim 39, wherein the first control circuit is configured to supply, to the control terminal of the first switch, a highest potential between a potential at the third node and a potential at the second node.

43. The device of claim 39, wherein a second switch couples the second node to a fourth node of application of a reference potential, and wherein the first control circuit is configured to control the second switch in pulse width modulation once potentials of the first and third nodes are substantially equal.

\* \* \* \* \*